Oct. 22, 1968
C. B. HAEGERT
3,407,383
BATTERY TERMINAL CLAMP WITH EMERGENCY
AND/OR AUXILIARY WIRE CONNECTORS
Filed March 23, 1966
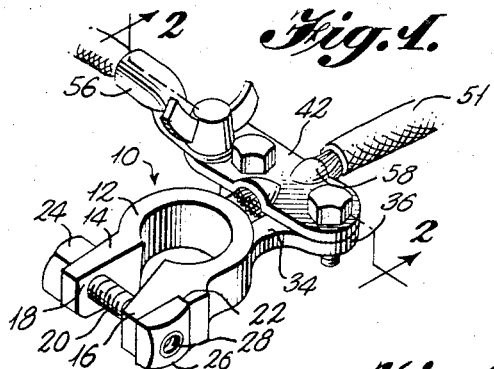
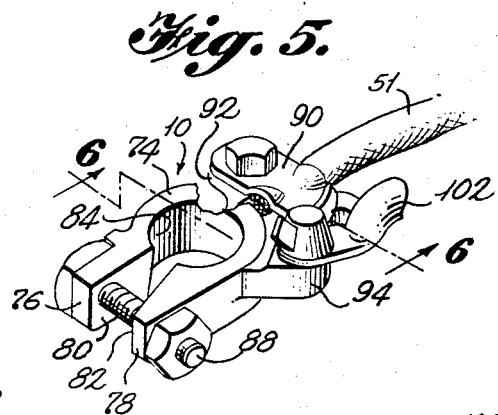
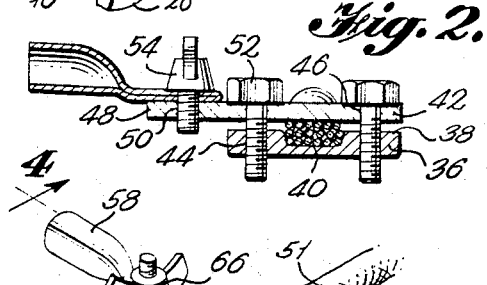
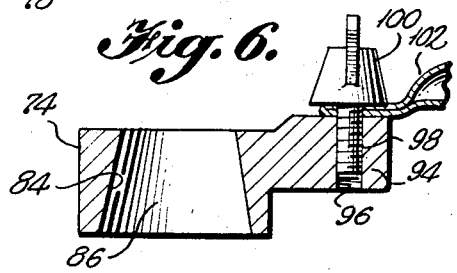
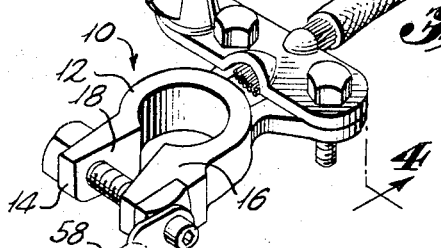
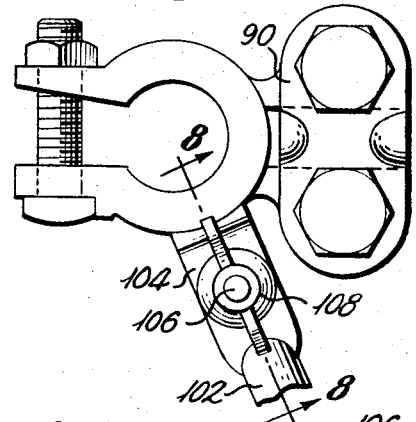
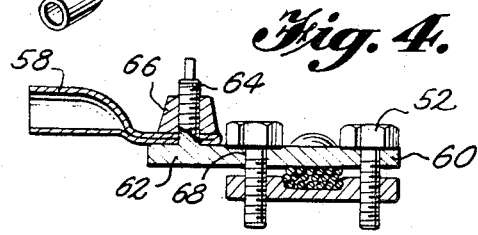
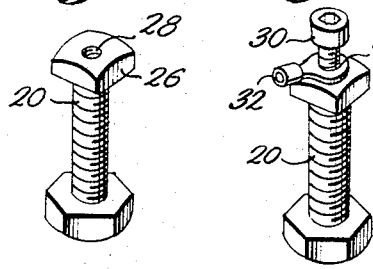
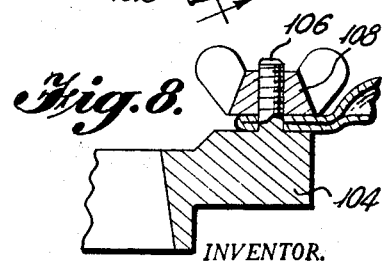
INVENTOR.
Clarence B. Haegert
BY
Shumaker and Mattare
ATTORNEYS United States Patent Office 3,407,383
Patented Oct. 22, 1968

3,407,383
BATTERY TERMINAL CLAMP WITH EMERGENCY
AND/OR AUXILIARY WIRE CONNECTORS
Clarence B. Haegert, P.O. Box 318,
Coffeyville, Kans. 67337
Filed Mar. 23, 1966, Ser. No. 536,743
5 Claims. (Cl. 339—230)

ABSTRACT OF THE DISCLOSURE

A battery terminal clamp comprises a one-piece split collar of resilient material defining spaced arms in a common plane. Means is provided for drawing the arms together to clamp a battery terminal. The body includes an integral laterally extending lug lying substantially in said plane, this lug having oppositely extending aligned wing portions with a strap connected thereto for clamping the battery cable. Connector means is provided for connecting an auxiliary electrical lead to the strap.

---

This invention relates generally to the class of battery terminal clamps.

More particularly, the invention is directed to novel improvements in battery terminal clamps having emergency wire cable connecting means associated therewith.

The battery terminal clamps of the present invention are of a construction to be permanently installed on or secured to a battery terminal to provide means for connecting to the clamp, either for emergency or for permanent use, a standard type of battery cable and to provide also desirable means for connecting an additional lead or leads to a standard battery clamp so as to permit the connection thereto of additional electrical equipment. Such additional equipment may be, for example, a standard type of FM radio, a two-way radio for intercommunications, an air-conditioning unit or similar equipment to be used in the automobile and for which there is no present ready attachment or individual terminal provided.

A further use for the battery terminal clamps of the present invention would be for effecting direct attachment of conductors to a battery to connect a group of batteries in parallel to power equipment.

One purpose of the present invention, therefore, is to provide means on the battery terminal clamp itself to which a number of conductors may be readily connected without interfering with or necessitating movement of attached clamps. Also, a second purpose is to provide a terminal or terminals for taking current from the battery of the automobile in which the battery is installed, in a circuit not controlled by the ignition switch and not involving connection to the automobile circuits to which conductors may be immediately attached.

In view of the foregoing it is a particular and important object of the present invention to provide an improved battery terminal clamp to which may be attached various power units, in addition to the standard automobile equipment.

It is another object of the present invention to provide novel wire terminal connectors for a wide variety of present battery terminal clamps to enable direct connection to be made to such clamps.

Still another object of the invention is to provide a novel battery terminal clamp having means whereby the standard or conventional battery cable may be easily and quickly secured thereto either as an emergency coupling or for permanent use, together with novel means whereby auxiliary wire connections may be made at different locations or positions on the battery post clamp itself thereby facilitating bringing in auxiliary wires or conductors toward the battery post clamp from different directions.

Other objects and advantages of the present invention will become apparent from a consideration of the following detailed description taken in connection with the accompanying drawings, wherein:

FIG. 1 is a view in perspective of one embodiment of the present invention showing a method of making an emergency coupling of a battery cable to the battery terminal clamp and means for effecting auxiliary connections to the clamp.

FIG. 2 is a sectional view taken substantially on the line 2—2 of FIG. 1 illustrating the use of a wing nut bolt threadably connected with the clamp plate, by which an auxiliary wire connection may be made with the clamp plate and also showing a wire connection lug connecting means carried by the battery post clamp bolt which closes the clamp on the battery post.

FIG. 3 is a view in perspective corresponding to FIG. 1 but showing the use of a wing nut threaded on a fixed stud carried by the clamp plate, by which to connect an auxiliary wire with the terminal clamp.

FIG. 4 is a sectional view taken substantially on the line 4—4 of FIG. 3.

FIG. 5 is a view in perspective of a battery terminal clamp including the means for establishing an emergency connection with the clamp of a battery cable and showing means for attaching an auxiliary wire conductor and lug to the clamp embodying a lug cast integral with the battery terminal clamp and tapped for receiving a threaded bolt and wing nut unit.

FIG. 6 is a sectional view taken substantially on the line 6—6 of FIG. 5 showing more clearly the wing nut and integral threaded bolt or stem for securing a terminal lug to the battery post clamp carrying lug and illustrating the tapered form of the battery terminal post clamp.

FIG. 7 is a top plan view on an enlarged scale of an embodiment of the invention corresponding to FIG. 5 showing the laterally projecting lug integral with the battery post clamp body with a conventional wing nut for securing an auxiliary wire terminal lug to the terminal post clamp lug.

FIG. 8 is a sectional view taken substantially on the line 8—8 of FIG. 7 showing the battery terminal post clamp carrying lug and the integral threaded stud for engagement by the wing nut.

FIG. 9A is a perspective view of the terminal post clamp closing bolt modified for receiving a wire terminal lug securing set screw.

FIG. 9B illustrates in perspective the bolt of the preceding figure showing the wire terminal lug in position for securement by the set screw threaded into the tapped bore of the bolt.

FIG. 9C is a perspective view corresponding to the preceding two views but illustrating the use of a threaded stud extending axially from the bolt for receiving a wire terminal carrying lug and a nut by which to secure the lug to the bolt.

The present invention provides a construction in the several illustrated embodiments whereby a quick connection may be easily and securely made to a battery terminal post, of the regular or standard battery cable. And the invention also embodies in the several forms thereof means for attaching terminal wires or terminal lugs of auxiliary wires to the battery terminal clamp at a number of selected positions, without disturbing the connection between the said battery cable and the terminal post clamp.

In each of several figures of the drawing, a battery terminal post clamp is illustrated, which is generally designated by the reference character 10. This clamp is designed, as will be readily apparent, to receive a battery terminal post to be secured thereon in a manner to firmly grip the post to establish a positive electrical connection therewith. This clamp may be made in any suitable size and is designed so that it may be closed tightly on either a large terminal post or on a smaller terminal post of the same battery. This is a feature which is important in clamps of this kind since it is conventional to provide storage batteries in which the negative post is of smaller diameter than the positive post. The construction of the post engaging clamp is such that a proper clamping action or clamping tension can be obtained without drawing the clamp jaw or arms completely together, as will be readily apparent from the hereinafter presented description of the different forms of the clamp.

Upon reference to the figures of the drawing it will be seen that each of the battery terminal clamps shown includes the usual split collar body adapted for encircling the battery terminal post, with the outwardly extending spaced arms, sometimes referred to as "jaws," and a bolt and nut means for drawing the ends of the arms toward one another whereby to constrict the split collar body and cause it to firmly grip the terminal post which it encircles.

Some slight variations exist between the clamp structures illustrated in the several different views, which variations will be hereinafter specifically pointed out, but in general the clamp consists of the stated split collar, the outwardly projecting spaced arms and the coupling bolt extending through and connecting the arms together and employed for drawing the arms toward one another but in each structure it will be seen that the form and disposition of the arms is such that the opposing sides or faces will never be brought flatly into contact one with the other so as to interfere with the tight closing of the collar around the battery terminal post.

Referring now to FIG. 1 it will be seen that the foregoing features are present in the structure here illustrated. In this figure the battery post clamping collar body portion is designated 12 and is in the form of a split annulus, the ends of the annulus formed by the split or division therein being joined to or forming a part of the outwardly extending arms 14 and 16.

The body 12 is, of course, formed of metal having some degree of resiliency so that the arms can be drawn toward one another for effecting the clamping of the collar around the battery terminal post.

The arms 14 and 16 have the opposing inner faces 18, the inner ends of the faces being relatively widely spaced apart and the faces extending outwardly in divergent relation as shown.

The arms 14 and 16 are provided with aligned openings for receiving the shank of a headed bolt 20, the outer side of one arm, here shown as the arm 16, being recessed as at 22 to form a seating recess for the head of the bolt whereby the bolt will be held against rotation when the nut 24 is threaded up thereon on the opposite end thereof.

The bolt 20 here illustrated in FIG. 1 is illustrated in perspective in FIGS. 9A and 9B where, in these figures the same reference numeral 20 is used for designating the bolt. The head of the bolt, designated 26, has formed therein and coaxially with the threaded shank thereof, the tapped bore 28. This tapped bore 28 is designed to receive the threaded shank of a set screw 30, illustrated particularly in FIG. 9B, employed for securing an end of a wire or wire terminal element, such as that designated 32, to the bolt when the latter is in the position employed for coupling the ends of the arms 14 and 16 together so that the wire secured by the set screw 30 will be electrically connected to the battery terminal post through the medium of the split collar body 12.

Another form of bolt structure, hereinafter described, may be employed in place of the bolt 20 for securing together the arms 14 and 16 of the terminal post clamping collar 12 and the other clamping collars hereinafter referred to in connection with the description of succeeding figures of the drawing.

The split clamping collar or body 12 lies in a plane common to the plane of the arms 14 and 16 which are at one side of the opening formed by the body 12. At the opposite side of the body from the arms there extends radially outwardly from the body 12 in the direction opposite to the arms 14 and 16, a substantially flat or plate-like lug 34 having oppositely extending wing portions 36 having the flat top surfaces 38, as most clearly shown in connection with this figure and FIGURE 2, the lug 34 between the flat top surfaces 38 of the wing portions being slightly recessed as indicated at 40.

The numeral 42 designates a clamp strap which, as shown, consists of a substantially flat strip of metal extending transversely of the lug 34 and overlying the top surfaces of the wing portions 36.

The wing portions 36 of the lug 34 are provided with tapped openings 44 and the clamp strap is similarly provided with openings or unthreaded apertures 46 spaced for alignment with the openings 44 when the clamp strap is in operative position. In this position one end of the clamp strap terminates flush with the outer end of one wing portion 36. However, the clamp strap is of a length with respect to the width of the lug 34 lengthwise of the wing portions 36, to project a substantial distance beyond the opposite wing portion as most clearly seen in FIG. 2, the projecting portion of the clamp strap here being designated 48.

The extended portion or projecting portion 48 of the clamp strap has a threaded opening 50 therethrough which is in line longitudinally of the strap with the openings 46.

The numeral 51 generally designates a conventional type of battery cable. Connection of the bared wires at the ends of this cable is effected by placing the ends of the wire portion within the recess 40 of the lug 34, beneath the clamp strap 42 between the openings 46 thereof. The clamping plate is drawn down tight toward the lug 34 by tap screws 52, passed through the unthreaded openings 46 of the clamp strap and threaded into the openings 44. The wire is then firmly held or compressed between the strap 42 and the lug 44 is illustrated particularly in FIG. 2.

At the outer end of the strap 49 from one of the tap screws 52 a winged stud screw 54 is provided to be threaded into the tapped opening 50 at the outer end of the clamp strap. This winged stud is employed for securing extra wire in electrical connection with the terminal post clamp body 12 either by the simple procedure of twisting the end of the wire around the winged stud and securing it tightly against the clamp strap or by the use of a conventional terminal lug such as that indicated at 56.

While the clamp strap 42 may be completely flat throughout, it may also be provided with the opposite raised edge portions as indicated at 58 whereby when the multi-wire cable is clamped to the lug 32 some of the cable at the two edges of the plate will be pressed up into the raised areas and tightly gripped or pressed downwardly onto the lug 34 between these raised or up-pressed or up-struck edge portions 58.

FIGS. 3 and 4 illustrate another embodiment of the invention as it is depicted by FIGS. 1 and 2.

In these FIGS. 3 and 4 the clamp as a whole is designated 10 as hereinbefore set forth and the body or split collar portion of the clamp is here designated 12, as in FIG. 1.

In the structure shown in FIGS. 3 and 4 all of the elements are of the same form with the exception of the clamp strap. Accordingly, in these FIGS. 3 and 4 the same reference characters are applied as were applied in FIGS. 1 and 2, with the exception of the clamp strap, here designated generally by the numeral 58, which is of a different form or modified from the strap 42 before referred to.

Also in FIGS. 3 and 4 there is illustrated the use of the bolt shown in FIGS. 9A and 9B, for securing a wire terminal lug to the head of the bolt.

Here in FIGS. 3 and 4 the wire terminal lug is designated 58 and, as shown, it is fixed in electrical connection to the headed end of the bolt 20 by passing the set screw 30 through an aperture of the lug whereby upon threading the set screw 30 inwardly the flatened apertured end of the lug will be tightly secured to the bolt.

In FIG. 9B a slightly different form of lug from that shown in FIG. 3, is illustrated where the lug 32 has the aperture 32′ to receive the threaded portion of the set screw 30. However, it will be readily appreciated that the operation is the same to the attachment of the lug 58 as for the attachment of the lug 32 to the end of the bolt.

In the structure illustrated in FIGS. 3 and 4, the clamp strap, here designated 60, may be of the same dimensions as to length, width and thickness as the clamp strap 42, whereby it can be secured in place by the tap screws 52 to secure the wire end of the cable 52 to the clamp. However, in this modified construction of the clamp strap, the outer end portion thereof designated 62 has, in place of a threaded aperture such as that at 50 in connection with strap 52, a fixed threaded stud 64 which, when the clamp strap is secured in position, stands uprightly to receive a standard or conventional type of wing nut 66 whereby to secure the wire terminal lug to the clamp strap in the manner illustrated in FIG. 4.

By making the clamp straps 42 and 60 of the same dimensions as respects the location of the apertures 46 of the strap 42 and the apertures 68 of the strap 60, it will be seen that the clamp straps would be interchangeable so that use might be made of wing nuts or winged studs as desired for securing them in cable clamping position.

While reference has been made particularly to the form of bolt shown in FIGS. 9A and 9B for connecting together the arms 14 and 16 of the battery post clamp body, another type of coupling bolt may be employed such as that shown in FIG. 9C. In this view the bolt illustrated is generally designated 68 and the head 70 thereof is provided with the integral axially extending threaded stud 72 designed to receive a binding nut 74 whereby to secure in electrical connection with the head of the bolt, any desired type of wire terminal such as that indicated at 76 or the nut could be used merely to secure a wrapped wire end to the stud desired.

The form of bolt shown at 68 in FIG. 9C may be readily substituted for the bolt 20 shown in FIGS. 1 and 3 as will be readily apparent.

FIG. 5 illustrates another embodiment of the invention wherein another form of the split ring clamping body is provided together with another method of attaching an auxiliary wire to the clamp.

In this figure the split collar clamping body is designated 74 while the arms extending from the ends of the collar are designated 76 and 78. These arms, like the arms 14 and 16, have inner faces relatively widely set apart, the inner face of the arm 76 being designated 80 while the inner face of the arm 78 is designated 82 and the inner surface of the collar is here designated 84.

The split collar 74 has the inner surface 84 tapered or slightly conical as indicated at 86 in FIG. 6, the taper being from the bottom upward so that the application of the collar to the top end of the battery terminal post is facilitated. Also, in this construction the bolt connecting the arms, while here illustrated as being of a conventional type and the same being designated 88, may be, if desired, be either of the type shown in FIG. 9B or that shown in FIG. 9C.

In addition to the inner surface of the collar 74 being tapered or conical, the structure here shown has the inner face of one arm, here designated as the arm 76, not only flat but in a plane substantially perpendicular to the axis of the bolt 88 while the inner face 82 of the arm 78 flares outwardly from the inside of the collar away from the face 80 and it is therefore in a plane oblique to the axis of the bolt 88.

As will be readily apparent, this construction may be used in the clamping collars of FIGS. 1 and 3 and likewise the outwardly flaring faces of the arms of these figures may be used in the structure of FIG. 5 in place of the flaring inner face and the straight inner face.

In the structure of FIG. 5 the collar has formed integrally therewith the same type of cable attaching lug as the lug shown in FIG. 1 and designated 34. Here, however, the clamping strap 90 is shorter so that its ends terminate at the ends of the wings of the lug, one only of which wings is shown in FIG. 5 and designated 92.

The numeral 94 designates a lateral or obliquely extending lug which is cast or molded in one piece with the wall of the body 74 and this provides an auxiliary wire attaching means. This lug 94 is provided with the tapped bore 96 for receiving the threaded shank 98 or the threaded portion of a winged stud 100. By this means the bare end of a wire can be secured to the lug 94 by winding it around the stud or the stud can be extended through the conventional wire terminal lug here illustrated and designated 102.

In another embodiment of the invention illustrated in FIGS. 7 and 8, the laterally extending lug for attaching an auxiliary conductor wire to the post engaging collar is of modified form or construction. Here in FIG. 7 the split collar forming the body of the clamp and the other parts of the clamp including the stud carrying the wire clamping plate 90 are of the same form as the structure shown in FIG. 5 with the exception that the laterally projecting lug here designated 104, instead of having a tapped bore or passage therethrough corresponding to the bore 96 shown in FIG. 6, is formed or cast with an upstanding integral stud 106 which is screw threaded to receive the wing nut 108.

The wing nut 108 as shown in FIG. 8 and the nut 66 shown in FIG. 4, while being elements separate from the studs upon which they are threaded, are, in other respects the same as the head portions 54 and 100 of the winged studs 50 and 98, or, in other words, the head portions 54 and 100 of the winged studs are essentially wing nuts in spite of the fact that they are formed integrally with threaded stem portions instead of being bored and tapped to be threaded onto fixed studs as in FIGS. 4 and 8. Accordingly, in referring hereinafter to a "wing nut" in connection with the claiming of means for securing wires or wire carrying lugs to the battery terminal post collars or to elements electrically connected with the collars, this term "wing nut" is intended to cover wing nuts formed integrally with a threaded stem and those formed with a threaded bore for engagement on a fixed stud.

From the foregoing it will be seen that there is provided by the present invention an improved and novel battery terminal clamp structure wherein means is provided for establishing a secure emergency connection therewith of the battery cable or of battery cables of different sizes, which connection may be of a temporary nature or may be made permanent. Also associated with the emergency cable connecting means is a means for effecting an easy and quick connection electrically between a conductor and the terminal post clamp without distrubing the engagement of the clamp on the battery terminal post and without disturbing the connection between the regular battery cable and the terminal post engaging clamp. Also in other embodiments of the terminal clamp structure fixed means are provided for attaching auxiliary wires to the clamp body, also without disturbing the engagement of the terminal post encircling collar or the connection between the collar and the regular battery cable.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. A battery terminal clamp comprising a split collar body of resilient material adapted for encircling a battery terminal and having spaced ends, means forming spaced arms extending from said ends in a common plane with the body, means for drawing said arms toward one another for constricting the collar body in clamping engagement with a battery terminal post encircled by the collar, said body being of one-piece construction and including a lug extending laterally therefrom and lying substantially in said plane, said lug being substantially plate-like having oppositely extending wing portions extending substantially equidistantly from the medial portion of the lug, each wing portion having a threaded opening therethrough, and means for clamping an end of a battery cable to the body comprising an elongate clamp strap on and extending across the lug above said wing portions, threaded elements extending through said strap for threaded engagement in said threaded openings of the wing portions, said clamp strap having a length greater than that of said aligned wing portions and the medial lug portion so that an end portion of the strap extends beyond an underlying wing portion when it is secured upon said wing portions to provide a lateral strap portion for connection to an auxiliary conductor, and connector means for connecting an auxiliary conductor to said lateral strap portion.

2. Apparatus as defined in claim 1 wherein said electrical connector means comprises a wing nut and screw thread means, said lateral strap portion having a threaded hole for receiving said screw thread means.

3. Apparatus as defined in claim 1 wherein said connector means comprises a threaded stud fixed to said lateral strap portion and nut means having a threaded bore for receiving said stud.

4. Apparatus as defined in claim 1 wherein the said means for drawing said arms toward one another comprises a headed bolt extending between and through said arms and wherein there is another means for securing another auxiliary electric current conductor in electrical connection with said collar, carried by the head of said bolt.

5. Apparatus as defined in claim 1 wherein said arms have opposing inner faces at least one of which extends obliquely of the said bolt connecting the arms.

References Cited

UNITED STATES PATENTS

| 609,888 | 8/1898 | Leonard | 339—263 X |
| 1,103,544 | 7/1914 | Smith | 339—263 X |
| 1,175,651 | 3/1916 | Marko | 339—224 X |
| 2,039,669 | 5/1936 | Tenney | 339—230 X |
| 2,381,938 | 8/1945 | Tenney | 339—233 |
| 2,935,726 | 5/1960 | Raymond | 339—231 |
| 2,940,060 | 6/1960 | Haegert | 339—230 X |
| 3,118,719 | 1/1964 | Overby | 339—226 |
| 3,230,499 | 1/1966 | Haegert | 339—230 |

FOREIGN PATENTS

| 899,272 | 8/1944 | France. |
| 459,551 | 5/1928 | Germany. |

MARVIN A. CHAMPION, *Primary Examiner.*

P. TEITELBAUM, *Assistant Examiner.*